April 17, 1934.                C. A. STYER                 1,955,315
                          PHOTOSENSITIVE DEVICE
                          Filed May 28, 1930
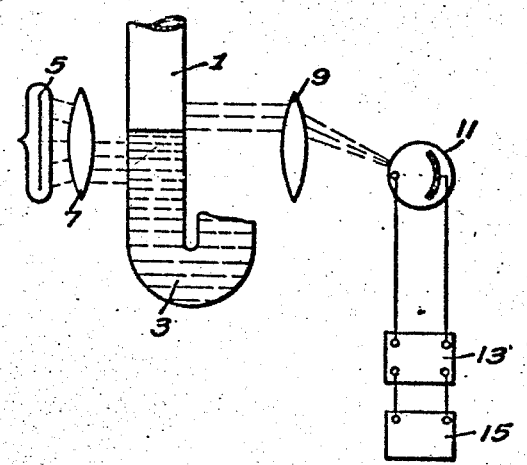
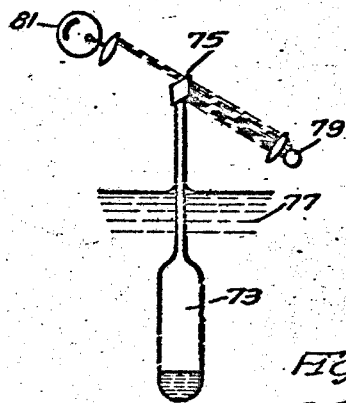
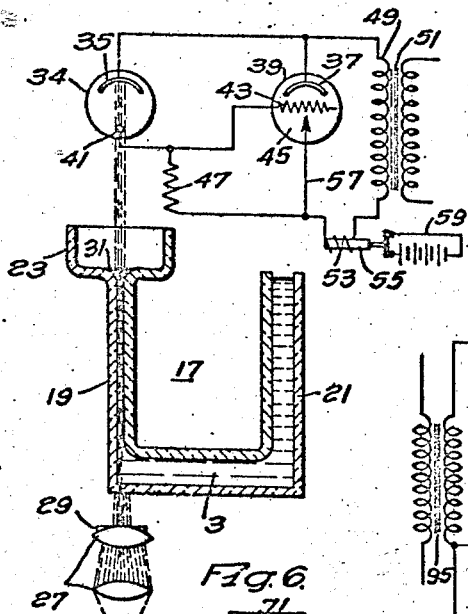
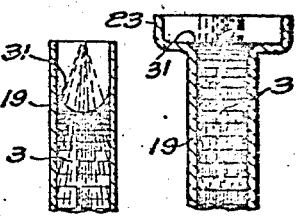
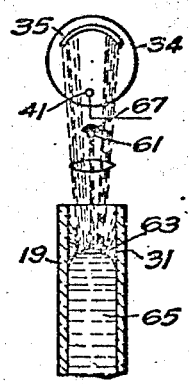
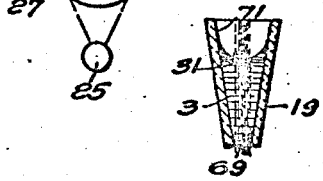
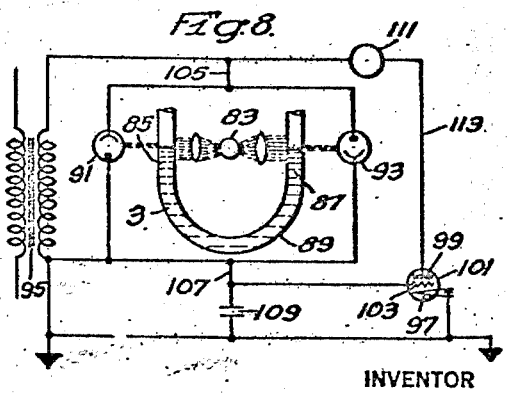
INVENTOR
Charles A. Styer.
BY Chesley G. Carr
ATTORNEY Patented Apr. 17, 1934

1,955,315

UNITED STATES PATENT OFFICE 1,955,315

PHOTOSENSITIVE DEVICE

Charles A. Styer, Forest Hills, Pa., assignor to Westinghouse Electric & Manufacturing Company, a corporation of Pennsylvania Application May 28, 1930, Serial No. 456,783

6 Claims. (Cl. 177—351)

My invention relates to photo-sensitive devices and has particular relation to photo-sensitive apparatus whereby the properties of fluids are observed.

It is an object of my invention to provide photo-sensitive apparatus for observing the properties of fluids.

It is a specific object of my invention to provide apparatus for detecting minute variations in the height of a liquid.

Another specific object of my invention is to provide apparatus for detecting minute variations in fluid pressure. An additonal specific object of my invention is to provide apparatus for detecting small variations in the density of a fluid.

A further object of my invention is to provide apparatus for observing the action of a manometric liquid at a station remote from the liquid.

An ancillary object of my invention is to provide apparatus for measuring the interfacial tension between a liquid and the surfaces of the receptacle in which the liquid is disposed.

Still another object of my invention is to provide apparatus for indicating that a liquid has passed beyond a certain position in a manometric tube.

A still further object of my invention is to provide, for equipment wherein a gas is being manipulated, apparatus for indicating that the pressure of the gas differs from a certain predetermined value.

More precisely stated, it is an object of my invention to provide apparatus for the electro-mechanical indication of the state of a fluid with respect to its predetermined properties.

According to my invention, I provide manometric apparatus equipped with a photo-sensitive device responsive to the condition of the manometric liquid. As manometers are ordinarily used under a variety of conditions, a certain prescribed arrangement of the operating elements thereof, is not always possible. Consequently, I have provided apparatus that shall be applicable to different contingencies as they arise.

I have, furthermore, provided a photo-sensitive fluid-density balance similar, in its general make-up and in the general principles of its operation, to the manometric apparatus.

The novel features that I consider characteristic of my invention are set forth with particularity in the appended claims. The invention itself, however, both as to its organization and its method of operation, together with additional objects and advantages thereof, will best be understood from the following description of specific embodiments, when read in connection with the accompanying drawing, in which Figure 1 is a schematic drawing of a modification of my invention;

Fig. 2 is a schematic drawing showing a second modification of my invention,

Fig. 3 is an enlarged view, in section, showing a portion of the capillary tube of the apparatus shown in Fig. 2, with the level of the manometric column below the top of the tube.

Fig. 4 is an enlarged view, in section, showing a portion of the capillary tube of the apparatus shown in Fig. 2, with the level of the manometric column above the attenuated portion of the manometric tube, Fig. 5 is a schematic drawing showing the arrangement of the principal elements of the apparatus for a system wherein my invention is specifically applied to an opaque liquid, such as mercury, Fig. 6 is a view, in section, showing the manometric tube of a modification of my invention, Fig. 7 is a schematic drawing showing a third modification of my invention, and Fig. 8 is a schematic drawing showing apparatus whereby small differences in the height of a manometric column may be measured.

The apparatus shown in Fig. 1 comprises a transparent tube 1 having a manometric liquid 3, disposed therein, that responds to external conditions by changing its position along one dimension of the tube 1. The total length of tube 1, along which the liquid varies, is illuminated by the light, emanating from an attenuated filament 5, that is collimated by a lens 7 disposed between the tube 1 and the filament.

I have found that it is preferable that the manometric liquid 3 be virtually opaque. However, if the necessity therefor arises, it is possible to use a colorless or translucent liquid. In either case, the light from the source 5 is either partially or completely absorbed by the column of the liquid 3 that extends into the illuminated section of the tube 1. Moreover, if the rays from the source 5 are directed obliquely to the tube the liquid then totally reflects and refracts the rays out of their original path.

In any case, the portion of the light radiations that are not absorbed are transmitted through the tube 1, converged by a second lens 9 situated in the path of the light pencil, and impinged upon a photo-electric cell 11 that is adjacent to the lens.

The output of the photo-cell 11 feeds into an amplifier 13 which, in turn, feeds into signalling apparatus 15 of a type dictated by the requirements of the equipment wherein the device is installed.

The type of amplifying apparatus 13 that is used in connection with the photo-cell depends on the particular equipment wherein the photo-sensitive manometer is installed. In certain equipment, it is desirable to know the gradual variation of the position of the indicating liquid. In such case, an ordinary thermionic amplifier may be used with the photo-cell.

If an audible signal is desired, an interrupter may be disposed at any position in the beam of light to yield the necessary pulsations in the photo-cell current. However, under ordinary circumstances, the commercial 60-cycle power produces the necessary fluctuations in the intensity of the light source 5.

In certain other equipment, it is essential that the condition of the material, of which the manometer indicates the properties, shall be kept between certain predetermined limits. An example of such apparatus is found in the production of chlorine by the electrolytic process.

To prevent the leakage of chlorine from the anode to the cathode compartment or from the cells themselves, it is necessary that the pressure of the gas in the manifold be kept below a predetermined value. In apparatus of this nature, constructed and operated according to the teachings of the prior art, it has been customary for an operator to watch a manometer disposed in the manifold and to regulate the pressure of the gas in accordance with the reading of the manometer.

In apparatus constructed according to my invention, an electro-magnetic trigger device is provided for equipment of the nature described hereinabove. Where it is possible to use a manometer of the type shown in Fig. 1, an amplifier 13, is used, of which the constants are so related that the illumination on the photo-cell 11 effects the release of a comparatively heavy current when the liquid 3 in the tube 1 rises or drops to a certain point. In practice, a relay device, such as a grid-glow tube, is often disposed in the circuit of the photo-cell or of an amplifier associated therewith to produce the necessary trigger action. A device of this nature is included in the electrical circuit of a modification of my invention and will be described hereinafter.

Manometric apparatus of the type shown in Figs. 2, 3, 4, 5 and 6 is provided for equipment wherein the ordinary manometric tube, such as is shown in Fig. 1, cannot be applied.

The apparatus shown in these drawings comprises a U-shape tube 17 having an arm 19 of comparatively small internal cross-sectional area. I have found that, for most purposes, it is desirable that the arm 19 shall have a capillary bore. In general, it is desirable that the cross-sectional area of the arm be so small that the manometric liquid 3 disposed therein shall have a meniscus of appreciable curvature.

The capillary arm 19 communicates with a second arm 21 of wider bore, at its lower end, and is in communication with a chamber 23 of comparatively large internal cross-sectional area at its upper end. Under ordinary circumstances, the chamber 23 is open to the atmosphere, while the arm 21 of wide bore is under the action of the material that is being investigated.

An optical system including a source of light 25, a collimating lens system 27 and a mask 29, coact to produce a narrow pencil of light that longitudinally traverses the manometer column 3 disposed in the capillary arm 19.

If the level of the manometric liquid 3 is below the top of the capillary arm 19, the surface 31 of the liquid has appreciable curvature and, as a result, the light traversing the liquid is partially reflected thereby and partially refracted to the sides of the tube 19. On the other hand, if the upper level of the liquid 3 is above the top of the capillary tube 19, it spreads over the receptacle 23 that is in communication with the capillary tube 19, and its surface 31 is substantially planar. In this case, the pencil of light is neither refracted nor totally reflected and passes through the surface to impinge on a photo-cell 34 disposed adjacent to the container 23.

The cathode 35 of the photo-cell 34 is connected to the cathode 37 of a grid-glow tube 39 while the anode 41 of the cell 34 is connected to the grid 43 of the tube 39 directly, and to the anode 45 of the tube through an impedance 47. An electromotive force is impressed between the cathode 37 and the anode 45 of the grid-glow tube 39 from the secondary 49 of a transformer 51 connected to a source of supply of electrical energy.

The actuating coil 53 of a contactor 55 is disposed in the anode-cathode-circuit 57 of the grid-glow tube 37 and responds to the electrical condition of the tube by closing or opening a circuit 59 which actuates a signalling device or acts on the material under observation to properly modify the property thereof that is being observed.

When the level of the liquid 3 is below the top of the capillary tube 19, the photo-cell 34 is in a comparatively unexcited state, and the tube 39 is, consequently, in an excited state. A heavy current traverses the contactor coil 53, and the signalling or control circuit 59 is open.

On the other hand, when the level of the liquid 3 is above the top of the capillary tube 19, the photo-electric cell 34 is in an excited state, and the grid-glow tube 39 is in an unexcited state. The signalling or control circuit 59 is then open.

The system illustrated in Figs. 2, 3 and 4 applies to equipment wherein the manometric liquid is transparent. My invention is also applicable to apparatus wherein an opaque liquid, such as mercury, is used. The elements of a system that I have found particularly useful in this connection are shown schematically in Fig. 5.

The apparatus in this figure comprises a comparatively small source of light 61, the rays from which are converged to the reflecting surface 63 of the manometric liquid 65. The photo-electric cell 34 has a comparatively large cathode in this case and is disposed behind the source 61, while a shield 67 is interposed between the source 61 and the cell 34. The curvature of the meniscus 63 of the manometric liquid 65 determines the quantity of radiation that impinges on the photo-cell 34.

The apparatus that has been described hereinabove applies specifically to equipment wherein it is desirable to maintain a property of the material under consideration within certain limits. If, however, it is desirable that the instantaneous condition of the material with reference to a property be known, the apparatus is modified to a certain extent.

A modified capillary tube that I have found useful for such equipment is shown in Fig. 6, the tube varies in cross-sectional area continuously and specifically, the cross-sectional area of its lower end 69 is smaller than the cross-sectional area of its upper end 71. The meniscus 31 of the manometric liquid decreases in curvature as the level of the liquid rises and, consequently, the transmitted or reflected light varies from a minimum at the lowest level of the liquid to a maximum at its highest level.

In utilizing this modification of my invention, a grid-glow tube 39 is not used in the output circuit of the photo-cell 34 but is replaced by an amplifier, such as is used in the aparatus shown in Fig. 1.

It is well to point out here that a tube of varying cross-sectional area is only one of a number of contrivances wherein a variation in the curvature of a meniscus is attained. A similar effect may be obtained by producing a tube having an internal surface of such character that the interfacial tension between the liquid and the tube varies, e. g., the manometric tube may be surfaced on the inside by a plurality of materials or it may be compounded from a number of tubes of different materials.

It is also to be noted for a semi-transparent liquid, the light transmitted along a manometric column depends on the length of the column. This particular modification is within the range of equivalents of my invention.

Another modification of my invention that applies particularly to density determinations is shown in Fig. 7. A hydrometer 73, having an opaque plate 75 disposed on the end thereof, is immersed in the liquid 77 under consideration. The plate 75 partially obstructs the light rays that emanate from a source 79 on one side thereof and determines the state of excitation of a photo-electric cell 81 situated on the other side thereof. The extent to which the light from the source is obstructed depends on the vertical position of the plate 75 and, consequently, on the density of the fluid 77 under inspection.

It is well to mention here that devices for reflecting or refracting the light replacing the opaque plate 75 on the fluid density balance, are within the scope of my invention.

In making density determinations with my improved system an amplifier is commonly disposed in the output circuit of the photo-cell 81.

The device specifically shown in the drawing and described hereinabove applies, in particular, to liquid fluids. It may, of course, be also applied to gaseous fluids.

The density of a gas is ordinarily measured by observing the position of a balloon, counterbalanced by a plurality of concentrated masses, that float in the gas. It is obvious that, as far as the application of my invention is concerned, its application to gases is substantially the same as its application to liquids.

It is sometimes necessary to measure or to detect small differences in height between a plurality of manometric columns. A system that I have found particularly useful in this connection is shown in Fig. 8.

A source of light 83 is disposed in such manner that its rays are cast on a plurality of columns 85 and 87 of the liquid 3 disposed in a container 89. The light radiated from the source is partially obstructed by the liquid, but a certain fraction thereof traverses the tube 89 and impinges on a plurality of photo-cells 91 and 93 arranged in a circuit specifically described in a copending application of J. W. Dawson, Serial No. 453,917, filed May 20, 1930, and assigned to Westinghouse Electric and Manufacturing Company.

Briefly, the circuit comprises a transformer 95 that supplies power between the cathode 97 and the anode 99 of an electron-discharge tube 101. The photo-electric cells 91 and 93 are connected in parallel in such manner that certain of them (93) pass current to the grid 103 of the tube while the remainder of them (91) carry current away from the grid 103.

One common terminal 105 of the cell circuit is connected to one terminal of the secondary of the power-circuit transformer 95, and the remaining common terminal 107 is connected to the grid of the tube. A condenser 109 is connected between the grid 103 and the cathode 97 of the tube 101. A meter 111, symbolizing any signalling device or any requisite mechanical device, is disposed in the plate circuit 113 of the tube 101.

It is seen that, for a slight predominance of the state of excitation of the photo-cells passing current in one direction over the state of excitation of the photo-cells passing current in the opposite direction, the electrical balance is upset, and a large variation in plate current of the tube takes place. The plate current, in passing through the signalling device 111, effects the necessary motivation of the equipment.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In apparatus for indicating changes in the physical conditions of a work system, a tube having a plurality of different cross-sections along its length, a liquid disposed in said tube, means cooperating with said tube, said liquid and said work system to actuate said liquid to move longitudinally in said tube, in accordance with the variations in the conditions of said system, thereby to vary the curvature of the meniscus of said liquid as the surface of the liquid attains positions of different cross-sections, means for projecting a beam of radiant energy on the meniscus of said liquid and photo-sensitive means, to be energized by the resultant radiant energy modified by the meniscus of said liquid, to indicate the position of the surface of said liquid and the variations in the conditions of said system.

2. In apparatus for indicating variations in the physical conditions of a work system, a column of liquid, means cooperating with said column of liquid and said work system to vary the curvature of the meniscus of said liquid in accordance with the variations in the conditions of said system, means for projecting a beam of radiant energy on the meniscus of said liquid in such manner that the optic character of the resultant radiations modified by said meniscus is varied in accordance with the curvature of said meniscus and means to respond to the radiations emitted by said meniscus to indicate the variations in the conditions of said system.

3. In manometric apparatus, a receptacle comprising a section of comparatively small internal cross-sectional area and a section of comparatively large cross-sectional area, a liquid disposed in said receptacle, means for projecting a beam of radiant energy on the meniscus of said liquid in such manner that the resultant beam emitted by said liquid is modified in accordance with the curvature of said meniscus and means to respond to the radiations modified by said meniscus to indicate the longitudinal position thereof.

4. The method of indicating variations in the physical conditions of a work system with apparatus of the type incorporating a manometric column of liquid which comprises the steps of varying the curvature of the meniscus of said column of liquid in accordance with the variations in the conditions of said system, projecting a beam of radiant energy on the meniscus of said liquid and noting the variations in the optical characteristics of said beam after it has been modified by the optical properties of the meniscus of said liquid.

5. In manometric apparatus, a tube having a base of cross-sectional area that is a continuous function of its length, a liquid disposed in said tube, means for projecting a beam of radiant energy on the meniscus of said liquid in such manner that the resultant beam emitted is modified by said meniscus in accordance with the variations in the curvature of said meniscus and means to respond to the radiations emitted by said meniscus to indicate the longitudinal position of said liquid in said tube.

6. In apparatus for indicating changes in the physical conditions of a work system, a column of liquid, means cooperating with said column of liquid and said work system to vary the curvature of the meniscus of said liquid in accordance with the variations in the conditions of said system, means for projecting a beam of radiant energy on the meniscus of said liquid in such manner that the optic character of the radiations reflected by said meniscus is varied in accordance with the curvature of said meniscus and means to respond to the radiations reflected by said meniscus to indicate the variations in the conditions of said system.

CHARLES A. STYER